(12) United States Patent
Matasek et al.

(10) Patent No.: US 6,422,760 B1
(45) Date of Patent: Jul. 23, 2002

(54) FIBER OPTIC CONNECTOR MODULE

(75) Inventors: Jeffrey A. Matasek, Cedarburg, WI (US); Wenzong Chen, Naperville; Igor Grois, Northbrook, both of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/774,326

(22) Filed: Jan. 31, 2001

(51) Int. Cl.[7] .................................................. G02B 6/38
(52) U.S. Cl. ........................................... 385/60; 385/53
(58) Field of Search ............................... 385/60, 53, 62

(56) References Cited

U.S. PATENT DOCUMENTS 5,082,344 A * 1/1992 Mulholland et al. .......... 385/60
5,619,604 A * 4/1997 Shiflett et al. ................ 385/52
6,007,256 A * 12/1999 Asada et al. .................. 385/59
6,146,023 A * 11/2000 Weigel ........................ 385/139
6,331,079 B1 * 12/2001 Grois et al. .................... 385/53

* cited by examiner

Primary Examiner—Tulsidas Patel
(74) Attorney, Agent, or Firm—A. A. Tirva

(57) ABSTRACT

A fiber optic connector module is provided for terminating a fiber optic cable which includes at least one inner optical fiber surrounded by an outer jacket. A ferrule is terminated to an end of the optical fiber stripped of the jacket. A fixing body is fixed to the jacket rearwardly of the ferrule. A housing includes a front portion within which the ferrule is mounted and a rear portion within which the fixing body is mounted. The front portion has an open front end through which a mating end of the ferrule is exposed. The rear portion has an open rear end through which the fiber optic cable extends.

22 Claims, 7 Drawing Sheets

FIBER OPTIC CONNECTOR MODULE

FIELD OF THE INVENTION

This invention generally relates to the art of fiber optic transmission and particularly, to a fiber optic connector module.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed with the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter may be an in-line component, or the adapter can be designed for mounting in an opening in a panel, backplane, circuit board or the like.

Various problems continue to be encountered in designing fiber optic connector assemblies or other connector assemblies, including applications involving backplanes, motherboards, daughterboards and the like. Such problems often involve efforts to simplify the design of the connector assemblies, particularly, the modules which terminate the optical fibers. Such designs heretofore tend to be unduly complicated and expensive. The present invention is directed to solving these problems and to providing various improvements in such connector assemblies, particularly in the fiber optic connector modules.

SUMMARY OF THE INVENTION

An object, therefore, of the invention is to provide a new and improved connector assembly, particularly a fiber optic connector module.

Another object of the invention is to provide a new and improved fiber optic connector module for terminating a fiber optic cable which includes at least one inner optical fiber surrounded by strength members and an outer jacket.

In the exemplary embodiment of the invention, the module includes a ferrule terminated to an end of the optical fiber stripped of the jacket. A fixing body is fixed to the jacket rearwardly of the ferrule. A housing includes a front portion within which the ferrule is mounted and a rear portion within which the fixing body is mounted. The front portion has an open front end through which a mating end of the ferrule is exposed. The rear portion has an open rear end through which the fiber optic cable extends.

As disclosed herein, the front portion of the housing includes stop means engageable by the ferrule. Therefore, the ferrule and terminated fiber optic cable can be inserted into the open end of the housing and into abutment with the stop means. Complementary interengaging latch means are provided between the fixing body and the rear portion of the housing to hold the fixing body and terminated fiber optic cable within the housing. In the preferred embodiment, the latch means is provided by complementary interengaging snap-latch members on the fixing body and the housing engageable automatically in response to inserting the fixing body into the housing through the open rear end thereof at the same time that the ferrule and terminated fiber optic cable are inserted into the housing in abutment with the stop means.

According to one aspect of the invention, the fixing body includes a crimp section through which the optical fiber extends, with the strength members and outer jacket positioned on the outside of the crimp section. A crimp ring clamps the strength members and the jacket to the crimp section of the fixing body.

According to another aspect of the invention, a flexible strain relief boot surrounds the fiber optic cable and extends away from the rear portion of the housing. Complementary interengaging latch means are provided between the boot and the fixing body. In the preferred embodiment, the latch means is provided by complementary interengaging snap-latch members on the boot and the fixing body engageable automatically in response to mounting the boot on the fixing body. Therefore, the fixing body is latched at one end thereof to the housing and at another end thereof to the boot.

Finally, the housing includes a flexible latch arm for holding the connector within an opening in a panel, such as a backplane, circuit board or the like. The latch arm includes a latch hook on the outside thereof, along with serrations on the outside of the latch arm engageable by an operator's fingers.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Referring to the drawings in greater detail, and first to FIGS. 1–4, the invention is embodied in a mating connector assembly, generally designated 10, which includes a backplane connector assembly, generally designated 12, mateable with a daughterboard connector assembly, generally designated 14. The backplane connector assembly is mounted in an aperture 16 in a substrate, panel or backplane 18 which, in the preferred embodiment, is a printed circuit board. Specifically, backplane 18 can be considered the "motherboard" herein. The daughterboard connector assembly is mounted on a top surface of a second printed circuit board 20 which is considered the "daughterboard" herein.

Backplane connector assembly 12 includes an adapter, generally designated 22, which is mounted in aperture 16 in motherboard 18. Four fiber optic connector modules, generally designated 24, are inserted into adaptor 22, through aperture 16, from the front of backplane 18. Each fiber optic connector module is terminated to a multi-fiber cable 26. As will be seen hereinafter, each cable 26 is a flat or "ribbon" cable, having a plurality of optical fibers in a ribbon and surrounded by an outer cladding.

After daughterboard connector assembly 14 is mounted on daughterboard 20, four fiber optic connector modules, generally designated 28, are inserted into the back of a connector housing 30. Each module 28 is terminated to a flat, multi-fiber cable 32 which is a "bare" fiber optic cable in that it does not include an outer jacket. The fibers are terminated in ferrules 34, with mating ends of the ferrules and fibers exposed at a mating end 36 of connector housing 30. The connector housing is secured to daughterboard 20 by appropriate fasteners 38. A plurality of guides 40 project forwardly of connector housing Referring to FIG. 5 in conjunction with FIGS. 1–4, adapter 22 includes a housing 42 which may be fabricated of molded plastic material. The housing defines a front mating end 42a and a rear terminating end 42b. The front mating end is open and through which the ferrules (described hereinafter) of fiber optic connector modules 24 can project. Terminating end 42b is open, as at 42c, for receiving connector modules 24 in the direction of arrow "A". Housing 42 of adapter 22 has an outwardly projecting alignment rib 44 on each opposite side thereof and extending in the mating direction of the connector assembly for riding in slots 46 (FIG. 1) of side guides 40 of daughterboard connector housing 30. A pair of flexible, cantilevered latch arms 46 are provided on opposite sides of housing 42 for interengagement with complementary latch means (not visible in the drawings) within daughterboard connector housing 30. A pair of fasteners 48 extend through holes 50 in backplane 18 and into a pair of fastener nuts 52 on housing 42 to secure adapter 22 to the backplane, with mating end 42b extending into aperture 16 in the backplane as seen in FIGS. 1 and 3.

Figures 1, 5:
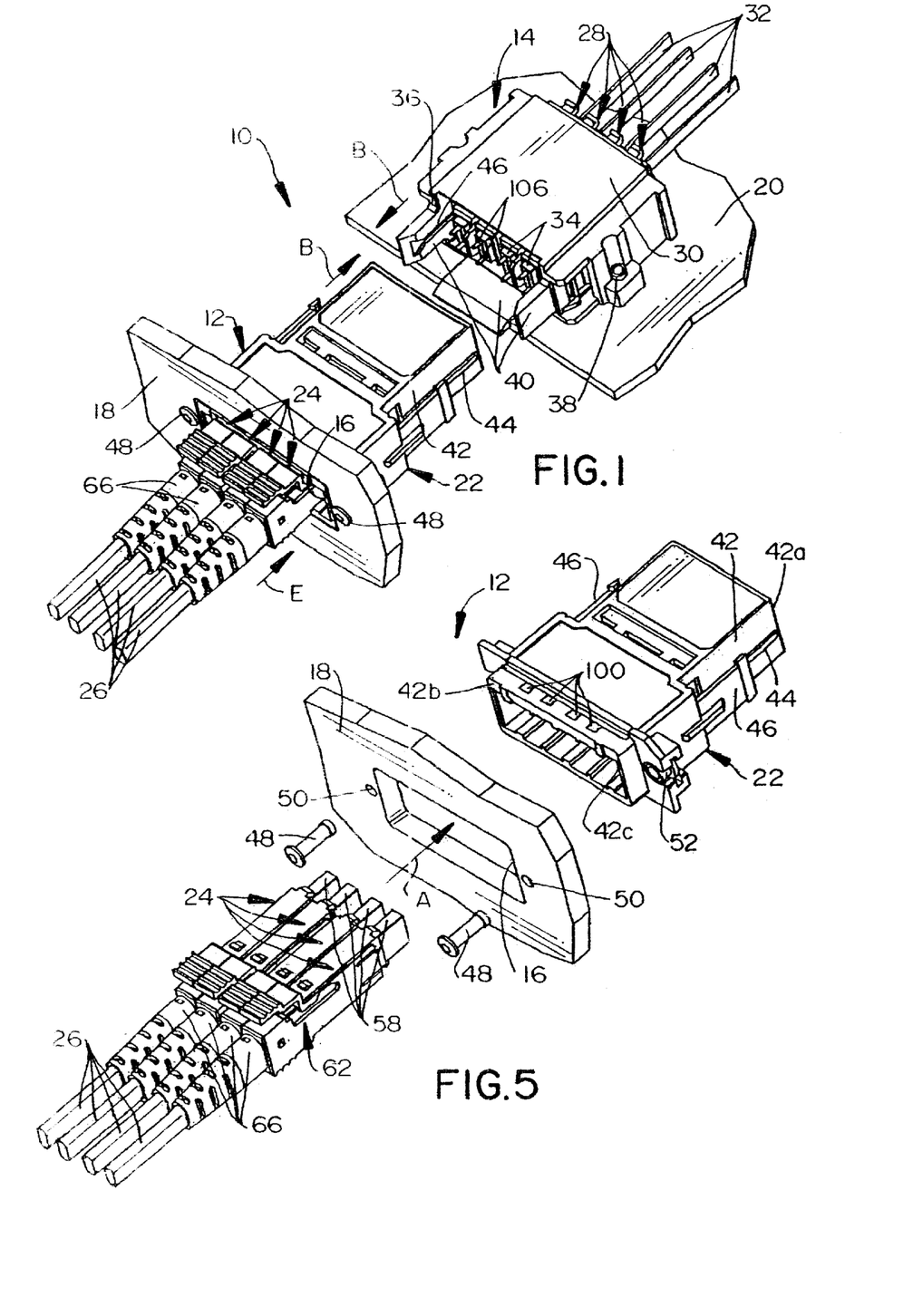
FIG. 1 is a perspective view of a mating connector assembly according to the invention, with the assembly in unmated condition.
FIG. 5 is an exploded perspective of the backplane connector assembly as seen to the left in FIGS. 1–4.
Figure 2:
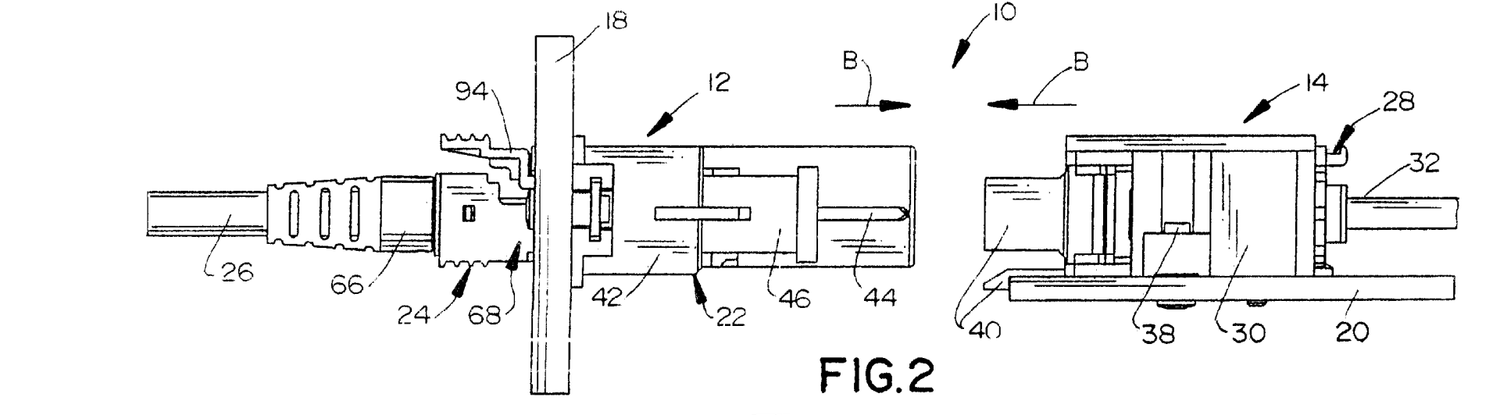
FIG. 2 is a side elevational view of the connector assembly as shown in FIG. 1.
Figure 3:
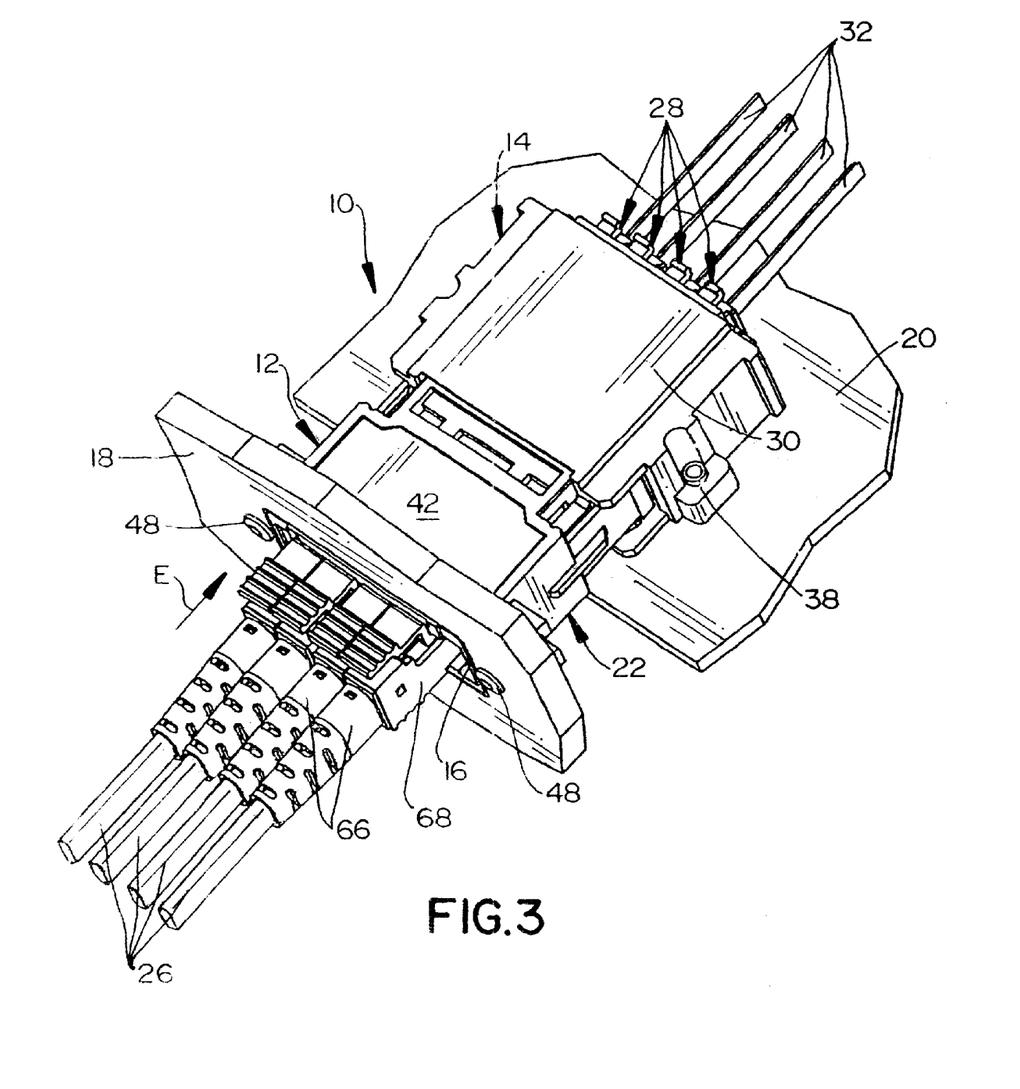
FIG. 3 is a perspective view of the connector assembly of FIG. 1, in mated condition.
Figure 4:
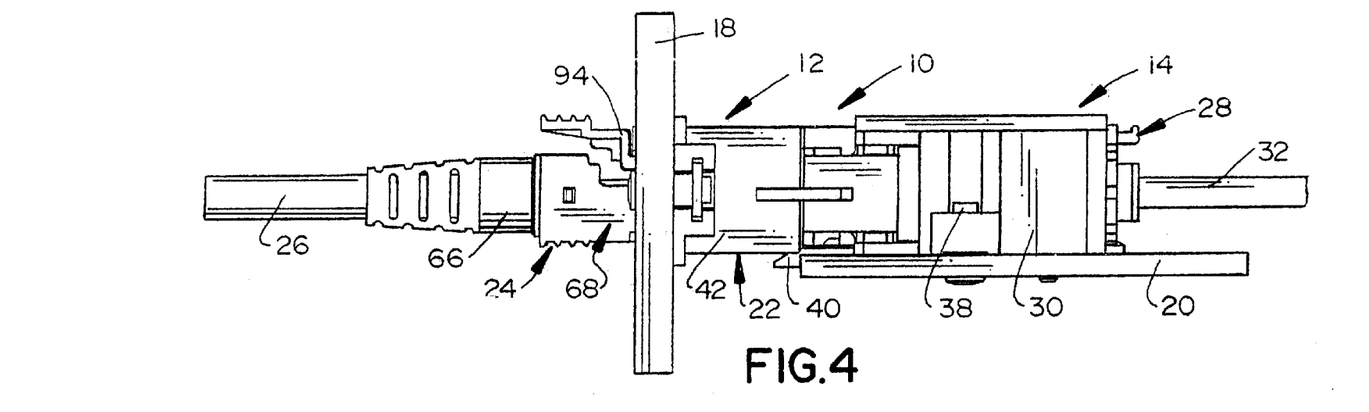
FIG. 4 is a side elevational view of the connector assembly in the mated condition of FIG. 3.

After backplane connector assembly 12 is secured to backplane 18 and daughterboard connector assembly 14 is secured to daughterboard 20, the backplane connector assembly and the daughterboard connector assembly are mateable in the direction of arrows "B" in FIGS. 1 and 2 wherein the fibers of cables 26 and 32 are functionally connected in the mated condition of the connectors shown in FIGS. 3 and 4. Typically, fiber optic connector modules 24 are inserted into adapter 22 and fiber optic connector modules 28 are inserted into daughterboard connector housing 30 before the connector assemblies are mated.

FIGS. 6–9 show the details and assembly of one of the fiber optic connector modules 24 of backplane connector assembly 12. As stated above, each module terminates a multi-fiber optic cable 26. The cable includes a multi-fiber ribbon 54 (FIG. 6) surrounded by strength members (not shown) and an outer jacket 56. Fiber ribbon 54 includes a plurality of individual inner optical fibers surrounded by a flat dielectric. Outer jackets 56 is stripped to expose the fiber ribbon and to leave jacket ends 56a. A ferrule 58 terminates the ends of the individual optical fibers, and the ferrule has a peripheral stop shoulder 60 which faces a forward mating end 58a of the ferrule.

Fiber optic connector module 24 further includes a fixing body, generally designated 62, along with a crimp ring 64, a strain relief boot 66 and a housing, generally designated 68. FIGS. 6–9 show the sequence of assembling these components of connector module 24. Before proceeding with the assembly sequence, further details of the components first will be described.

Figure 6:
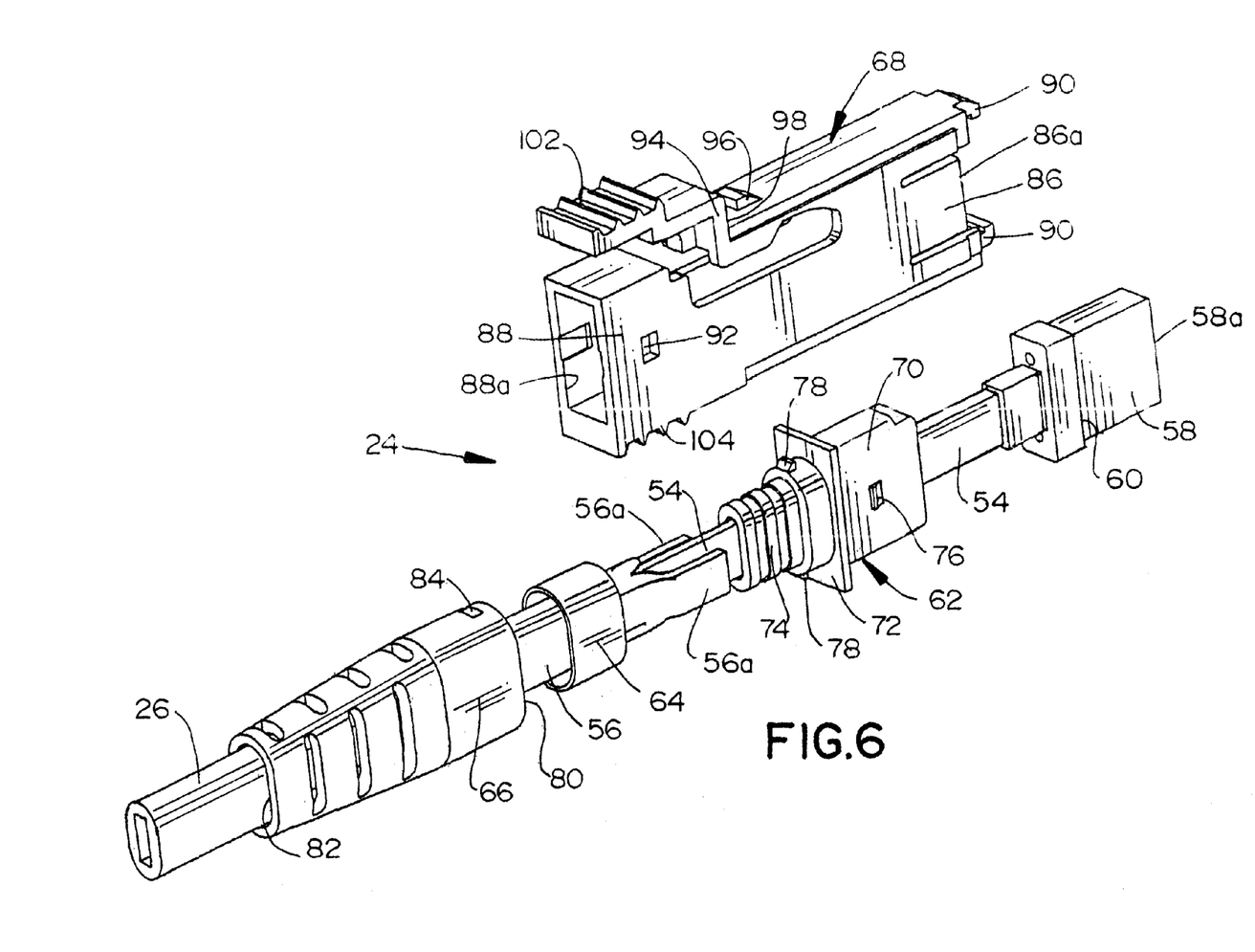
FIGS. 6–9 are sequential views showing the details and assembly of one of the fiber optic connector modules of the backplane connector assembly of FIG. 5.

Specifically, fixing body 62 includes a front end 70 in front of an outwardly projecting rectangular flange 72. An oblong crimp section 74 projects rearwardly of flange 72. A pair of chamfered or ramped latch bosses 76 are formed on opposite sides of front end 70, it being understood that the opposite side of fixing body 62 is substantially identical to the side of the fixing body visible in the drawings. A pair of chamfered or ramped latch bosses 78 are provided at the top and bottom of crimp section 74. The entire fixing body is a one-piece structure which may be molded of plastic material or die cast of zinc alloys.

Crimp ring 64 of connector module 24 is oblong in shape and is sized to fit over crimp section 74 of fixing body 62, with jacket ends 56a positioned between the crimp section and the crimp ring. The ring is fabricated of deformable material, such as metal, for clamping the jackets ends to the crimp section as seen hereinafter.

Strain relief boot 66 of connector module 24 is fabricated of elastomeric material and includes a front open end 80 sized to fit over crimp ring 64 and crimp section 74 of fixing body 62. The boot has a rear open end 82 sized for embracing fiber optic cable 26 which extends entirely through the boot and out of the rear end thereof. A pair of latch apertures 84 are formed in the top and bottom of the boot near the front end thereof for snap-latch engagement with chamfered latch bosses 78 of fixing body 62, as will be seen hereinafter.

Housing 68 of connector module 24 includes a front portion 86 within which ferrule 58 is mounted and a rear portion 88 within which fixing body 62 is mounted. The front portion has an open front end 86a through which mating end 58a of the ferrule is exposed along with the exposed ends of the optical fibers. The rear portion has an open rear end 88a through which boot 66 and fiber optic cable 26 extend. The housing is a one-piece structure which may be molded of plastic material. A pair of stop hooks 90 are molded integrally with the front portion of the housing and are directed inwardly for engaging stop shoulder 60 of ferrule 58. A pair of latch apertures 92 are formed in opposite sides of the housing in rear portion 82 for engaging latch bosses 76 on opposite sides of fixing body 62. The opposite side of the housing is substantially identical to the side visible in the drawings. An upwardly stepped latch arm 94 is formed at the top of the housing and includes a ramped latch boss 96 spaced from a shoulder 98. Shoulder 98 is positioned close to the front mating end 42b (FIG. 5) of adapter housing 42 with sufficient clearance to allow latch bosses 96 to interengage within latch apertures 100 (FIG. 5) of the adapter housing. Finally, serrations 102 are formed on the outside of latch arm 94, and serrations 104 are formed on the outside of the opposite side of the housing for grasping the entire connector module between. an operator's fingers.

The assembly of fiber optic connector module 24 in conjunction with FIGS. 6–9 now will be described. Referring first to FIG. 6, strain relief boot 66 and crimp ring 64 first are threaded onto fiber optic cable 26 as shown. Either before or after assembly of the boot and crimp ring, outer jacket 56 of the cable is stripped back to leave exposed fiber ribbon 54 and jackets ends 56a, as shown. Fixing body 62 then is threaded onto fiber ribbon 54. Ferrule 58 then is terminated to the individual fibers of fiber ribbon 54 by known processes.

Figure 7:
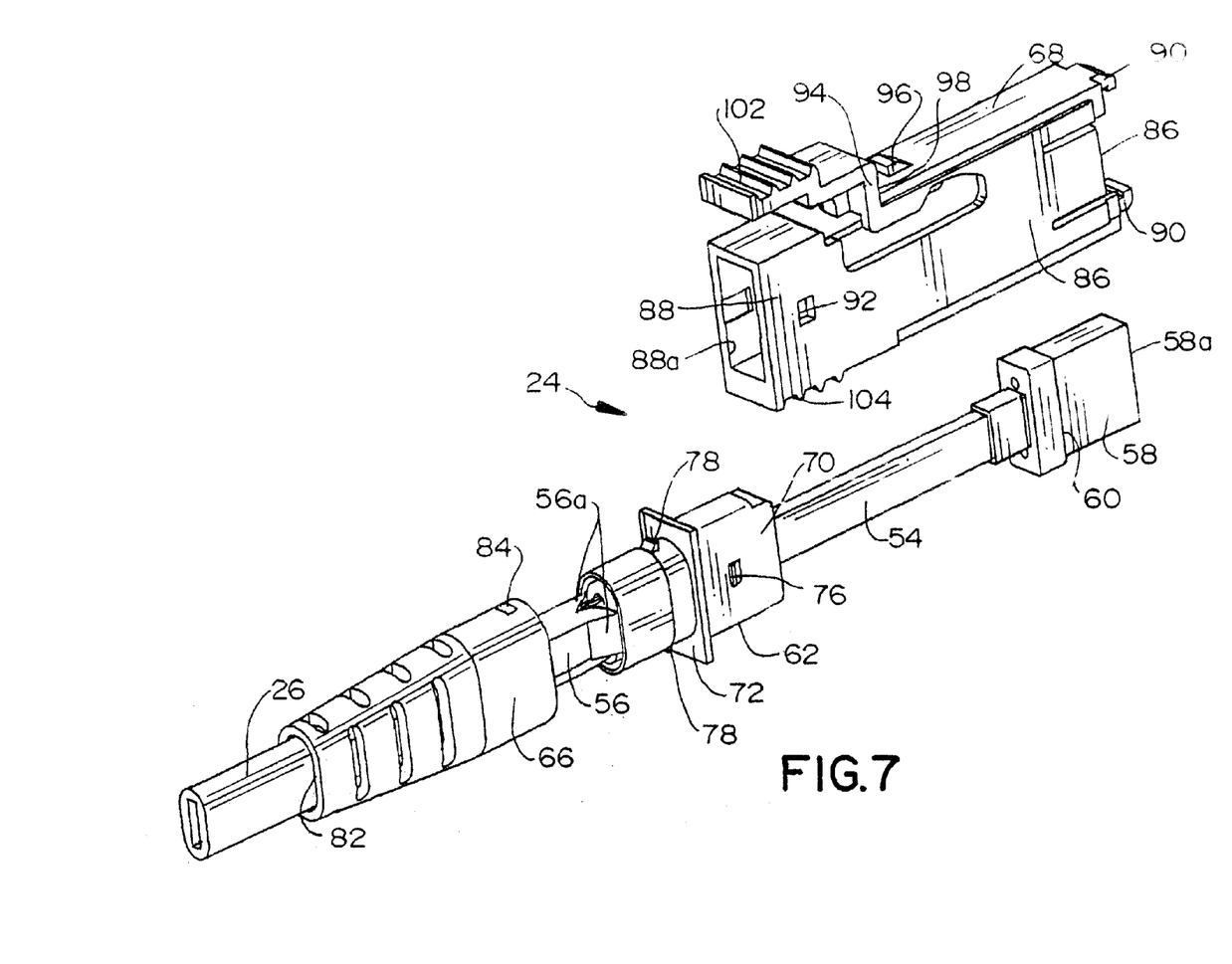

Either before or after ferrule 58 is terminated to the fibers, crimp ring 64 is positioned over crimp section 74 of fixing body 62, sandwiching strength members and jacket ends 56a between the crimp section and the crimp ring as shown in FIG. 7. The deformable crimp ring then is crimped to clamp the jacket ends to the fixing body.

Figure 8:
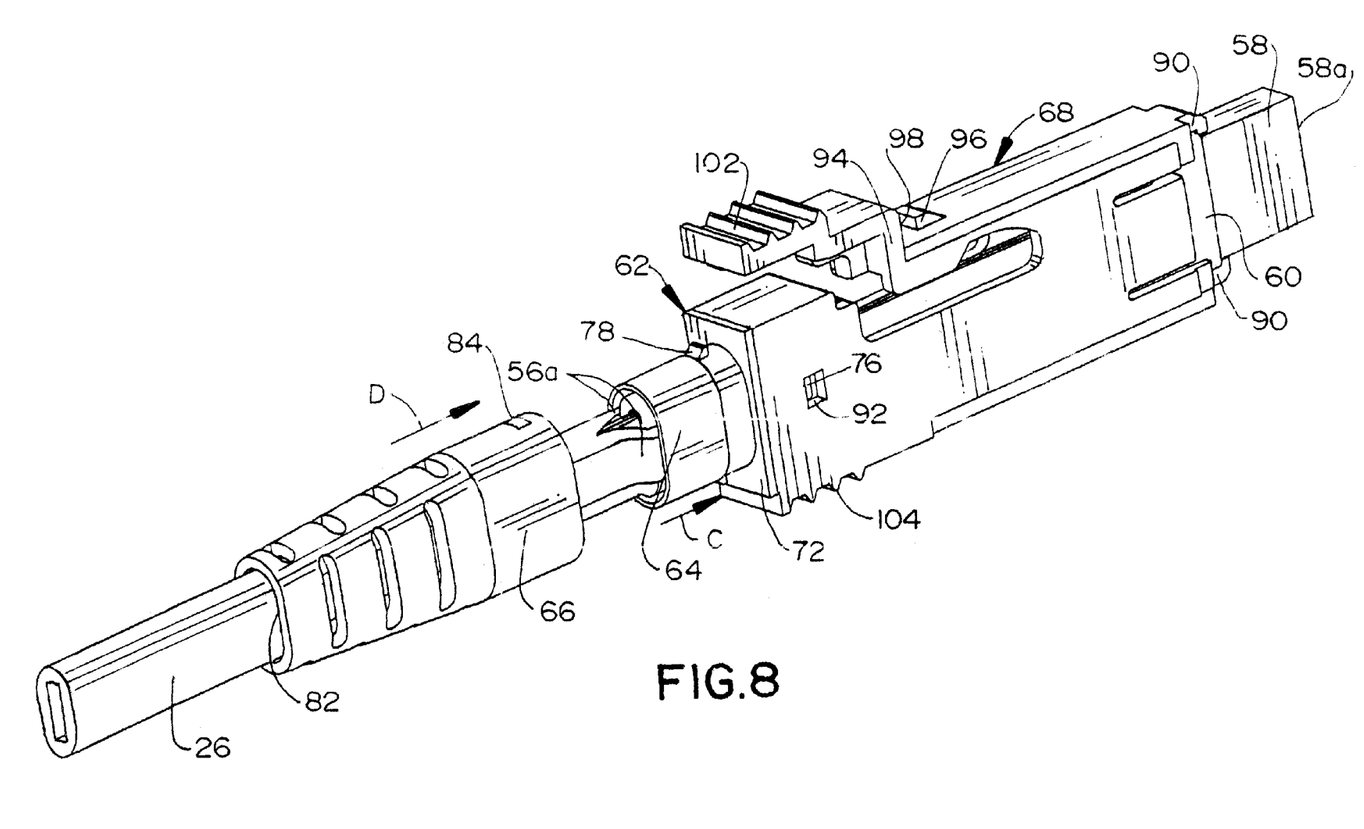

The subassembly of FIG. 7 then is inserted into housing 68 in the direction of arrow "C" to the assembled position of FIG. 8. When fully inserted, stop hooks 90 at the front of housing 68 abut against stop shoulder 60 of ferrule 58, and flange 72 of fixing body 62 abuts against the rear of the housing. When in this fully inserted position, ramped latch bosses 76 at opposite sides of the fixing body are snapped into latch apertures 92 at opposite sides of the housing.

Figure 9:
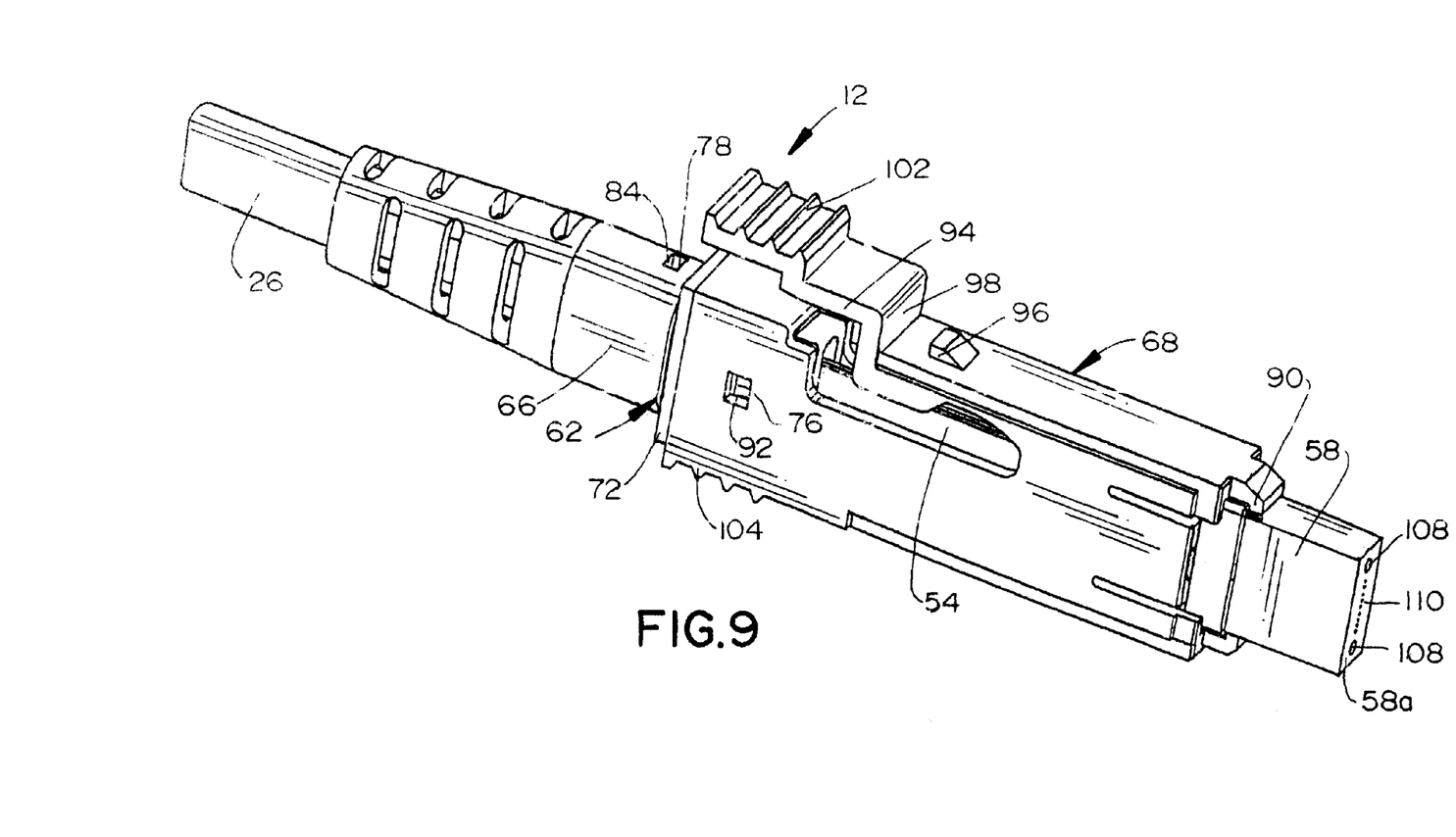

The final step is to move strain relief boot 66 forwardly in the direction of arrow "D" (FIG. 8) until latch apertures 84 snap into engagement with ramped latch bosses 78 on fixing body 62 as seen in FIG. 9. Of course, it should be understood that boot 66 could be attached to the fixing body before inserting the fixing body and ferrule 58 into open rear end 88a of housing 68.

Four fiber optic connector modules 24 are inserted in the direction of arrow "E" (FIG. 1) into adapter 22, after the four modules are assembled as described above. Backplane connector assembly 12 then can be mated with daughterboard connector assembly 14 in the direction of arrows "B" (FIGS. 1 and 2). During mating, alignment pins 106 (FIG. 1) from the ferrules of the daughterboard connector assembly enter alignment holes 108 (FIG. 9) in mating ends 58a of ferrules 58 of the backplane connector assembly. FIG. 9 also shows a plurality or line of optical fiber ends 110 which have been terminated in the ferrule from fiber ribbon 54 of fiber optic cable 26.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A fiber optic connector module for terminating a fiber optic cable which includes at least one inner optical fiber surrounded by an outer jacket, comprising:
   a ferrule terminated to an end of the optical fiber stripped of said jacket;
   a fixing body independent from the ferrule and fixed to the jacket rearwardly of the ferrule; and
   a housing including a front portion within which the ferrule is mounted and a rear portion within which the fixing body is mounted, the front portion having an open front end through which a mating end of the ferrule is exposed, and the rear portion having an open rear end from which the fiber optic cable extends.

2. The fiber optic connector of claim 1 wherein the front portion of said housing includes stop means engageable by the ferrule, wherein the ferrule and terminated fiber optic cable can be inserted into the open rear end of the housing and into abutment with the stop means.

3. The fiber optic connector of claim 1, including complementary interengaging latch means between the fixing body and the rear portion of the housing to hold the fixing body and terminated fiber optic cable within the housing.

4. The fiber optic connector of claim 3 wherein said latch means comprise complementary interengaging snap-latch members on the fixing body and the housing engageable automatically in response to inserting the fixing body into the housing through said open rear end thereof.

5. The fiber optic connector of claim 1 wherein said fixing body includes a crimp section through which the at least one optical fiber extends with the outer jacket positioned on the outside of the crimp section, and including a crimp ring for clamping the jacket to the crimp section.

6. The fiber optic connector of claim 1, including a flexible strain relief boot surrounding the fiber optic cable and extending away from the rear portion of the housing.

7. The fiber optic connector of claim 6, including complementary interengaging latch means between said boot and the fixing body.

8. The fiber optic connector of claim 7 wherein said latch means comprise complementary interengaging snap-latch members on the boot and the fixing body engageable automatically in response to mounting the boot on the fixing body.

9. The fiber optic connector of claim 1 wherein said housing includes a flexible latch arm for holding the connector within an opening in a panel.

10. The fiber optic connector of claim 9 wherein said latch arm includes a latch hook on the outside thereof, and including serrations on the outside of the latch arm engageable by an operator's fingers.

11. A fiber optic connector module for terminating a fiber optic cable which includes at least one inner optical fiber surrounded by an outer jacket, comprising:
    a ferrule terminated to an end of the optical fiber stripped of said jacket, the ferrule including forwardly facing stop means;
    a fixing body independent from the ferrule and fixed to the jacket rearwardly of the ferrule;
    a housing including a front portion within which the ferrule is mounted and a rear portion within which the fixing body is mounted, the front portion having an open front end through which a mating end of the ferrule is exposed, and the rear portion having an open rear end from which the fiber optic cable extends, the housing including stop means engageable with the stop means of the ferrule; and
    complementary interengaging snap-latch means between the fixing body and the rear portion of the housing,
    whereby the interengaging snap-latch means automatically engage in response to inserting the fixing body into the housing through said open rear end thereof as the stop means on the ferrule engages the stop means on the housing when the ferrule and terminated fiber optic cable are inserted into the housing.

12. The fiber optic connector of claim 11 wherein said fixing body includes a crimp section through which the at least one optical fiber extends with the outer jacket positioned on the outside of the crimp section, and including a crimp ring for clamping the jacket to the crimp section.

13. The fiber optic connector of claim 11, including a flexible strain relief boot surrounding the fiber optic cable and extending away from the rear portion of the housing.

14. The fiber optic connector of claim 13, including complementary interengaging second latch means between said boot and the fixing body.

15. The fiber optic connector of claim 14 wherein said second latch means comprise complementary interengaging snap-latch members on the boot and the fixing body engageable automatically in response to mounting the boot on the fixing body.

16. The fiber optic connector of claim 11 wherein said housing includes a flexible latch arm for holding the connector within an opening in a panel.

17. The fiber optic connector of claim 16 wherein said latch arm includes a latch hook on the outside thereof, and including serrations on the outside of the latch arm engageable by an operator's fingers.

18. A fiber optic connector module for terminating a fiber optic cable which includes at least one inner optical fiber surrounded by an outer jacket, comprising:

a fixing body fixed to the jacket of the fiber optic cable;

a housing including a rear portion within which the fixing body is mounted, the rear portion having an open rear end from which the fiber optic cable extends;

complementary interengaging first latch means between the fixing body and the rear portion of the housing to hold the fixing body within the housing;

a flexible strain relief boot surrounding the fiber optic cable and extending away from the rear portion of the housing; and complementary interengaging second latch means between said boot and the fixing body.

19. The fiber optic connector of claim 18 wherein said first latch means comprise complementary interengaging snap-latch members on the fixing body and the housing engageable automatically in response to inserting the fixing body into the housing through said open rear end thereof.

20. The fiber optic connector of claim 18 wherein said second latch means comprise complementary interengaging snap-latch members on the boot and the fixing body engageable automatically in response to mounting the boot on the fixing body.

21. The fiber optic connector claim 20 wherein said first latch means comprise complementary interengaging snap-latch members on the fixing body and the housing engageable automatically in response to inserting the fixing body into the housing through said open rear end thereof.

22. The fiber optic connector of claim 18 wherein said fixing body includes a crimp section through which the at least one optical fiber extends with the outer jacket positioned on the outside of the crimp section, and including a crimp ring for clamping the jacket to the crimp section.

* * * * *